Sept. 29, 1925.
J. DELAHUNT
SAFETY HOOK
Filed May 5, 1924
1,555,359
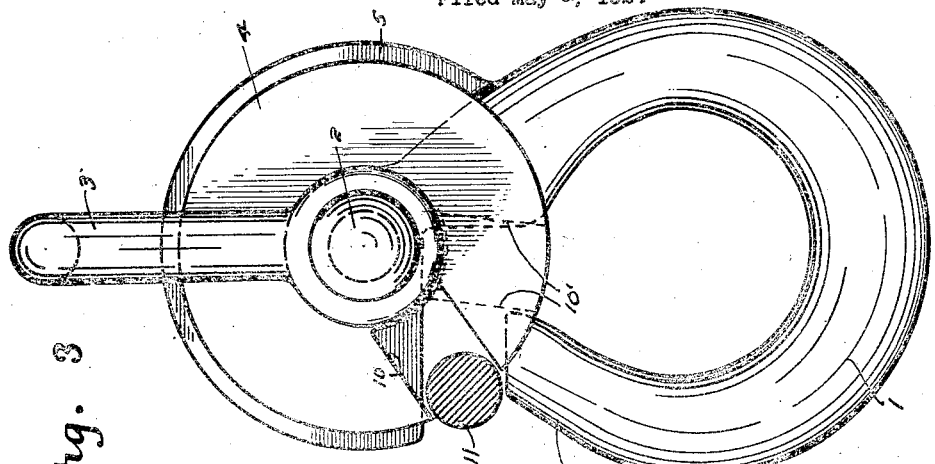
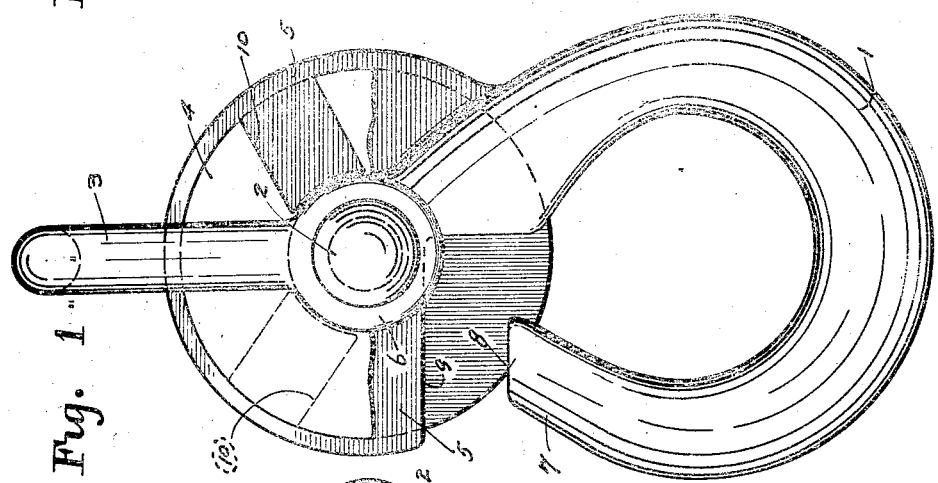
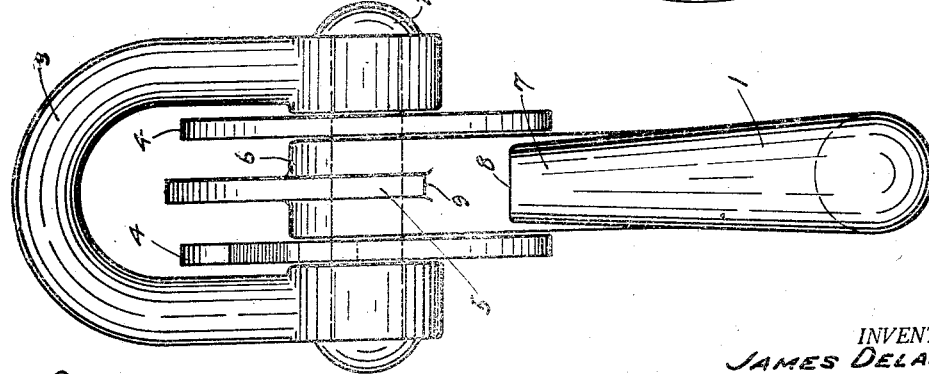
INVENTOR.
JAMES DELAHUNT
BY
ATTORNEYS.

Patented Sept. 29, 1925.

1,555,359

UNITED STATES PATENT OFFICE.

JAMES DELAHUNT, OF TENNANT, CALIFORNIA.

SAFETY HOOK.

Application filed May 5, 1924. Serial No. 711,086.

*To all whom it may concern:*

Be it known that I, JAMES DELAHUNT, a subject of the King of England, and a resident of Tennant, county of Siskiyou, and State of California, have invented a new and useful Safety Hook, of which the following is a specification.

This invention relates to hooks as used with chain and wire rope in connection with pulling and lifting of loads, especially to such hooks as used in the logging industry.

The object of my invention is to provide a hook of this type which will embody a simple locking device which will prevent the accidental slipping out of a link or clip hooked therein.

I realize the desired object in the hook construction shown in the accompanying drawings and in which:

Figure 1 is a side elevation of my hook as though suspended from its bail and has a portion of its forward locking disk broken away to show the inner guard disk.

Figure 2 is a side view of Figure 1 and Figure 3 shows the hook as per Figure 1 but with both locking disks revolved to align the receiving slots for entry of a link into the hook.

The essential elements of my invention comprise a hook (1) with a pivot (2) securing it to a bail (3), also two locking disks (4), one between the bail and the hook freely rotatable on the pivot (2), and a guard disk preferably formed as a part of the eye end (6) of the hook.

This guard disk may be as thick as the metal of the eye if desired, but as it functions no differently if not so thick it is preferably reduced as shown to avoid unnecessary weight.

The upper end of the tongue (7) of the hook preferably terminates in a flat end (8) and the guard disk (5) projects from the eye of the hook in a line parallel to the flat end (8) as shown at (9) so as to form a receiving slot or passage way for a link to pass into or out of the hook proper.

The locking disks are preferably a trifle smaller in diameter than the guard disk (5) so that they are not liable to be rotated by striking various objects on the ground in hauling or other service, and both locking disks have a notch or slot (10) extending inwardly from the edge.

The notches (10) may be aligned by manually revolving the disks to bring them into the position shown in Figure 3 and under which condition a link as sectioned at (11) may easily be passed in direction of the arrow into the hook, the disks meanwhile revolving to bring the notches to the dotted position (10').

To remove a link from the hook, the process described is reversed, and in order to gain the full advantage of the locking features of my device the disks are revolved to throw the notches (10) out of register as in Figure 1.

In using the hook with disks out of register there is no possibility of the link ever becoming accidentally unhooked unless the disks are deliberately revolved to align the notches in the proper place,—and if desired a greater number of disks may be used, two on each side, or two on one side and one on the other, etc., and in which case it would form almost a permutation lock.

Of course if several locking disks were employed as thus outlined, the central guard disk (5) could be entirely dispensed with.

Therefore, while I am aware of safety hooks for the same purpose for which my hook is intended, I do not know of any having the simplicity of mine combined with the complete locking features shown.

I claim:

1. A safety hook having its shank extended at one end to a point overlying and in spaced relation to the end of the bill so as to provide an intervening recess, a bail supporting pintle disposed in the extended end of the shank, a pair of disks disposed on either side of the said extended end and rotatably mounted on the end portions of the pintle and having radial recesses alineable with the said intervening recess upon rotation of the disks.

2. A safety hook having its shank extended at one end to a point overlying and in spaced relation to the end of the bill so as to provide an intervening recess, a bail supporting pintle disposed in the extended end of the shank, a pair of disks disposed on either side of the said extended end and extending beyond the edge thereof, said disks being rotatably mounted on the end portions of the pintle and having radial recesses alineable with the intervening recess upon rotation of the disks.

JAMES DELAHUNT.